US008662121B2

(12) United States Patent
Stanish

(10) Patent No.: US 8,662,121 B2
(45) Date of Patent: Mar. 4, 2014

(54) METHOD FOR REDUCING WARP POTENTIAL WITHIN LUMBER DERIVED FROM A RAW MATERIAL

(75) Inventor: Mark A. Stanish, Seattle, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 2438 days.

(21) Appl. No.: 11/393,992

(22) Filed: Mar. 30, 2006

(65) Prior Publication Data

US 2007/0234860 A1 Oct. 11, 2007

(51) Int. Cl.
*B23Q 15/00* (2006.01)
*B23Q 16/00* (2006.01)
*B27B 1/00* (2006.01)

(52) U.S. Cl.
USPC .......................................... 144/357; 144/356

(58) Field of Classification Search
USPC ......... 144/338, 357, 363, 360, 346, 350, 351, 144/369; 83/13, 35, 76.8, 76.7, 364, 365, 83/367, 368; 73/801, 597, 602, 622, 73, 73/75, 432.1; 250/330, 340, 358, 359.1, 250/334, 341, 563, 559.18; 382/141, 171, 382/108, 110, 154, 168, 170, 173
See application file for complete search history.

(56) References Cited

U.S. PATENT DOCUMENTS 4,881,584 A * 11/1989 Wislocker et al. .............. 144/39
4,972,154 A * 11/1990 Bechtel et al. ................ 324/663
4,984,172 A * 1/1991 Luminari ...................... 700/230
5,023,805 A * 6/1991 Aune et al. ...................... 702/38
5,394,342 A * 2/1995 Poon ............................ 702/137
5,421,385 A * 6/1995 McGee ......................... 144/357
5,429,161 A * 7/1995 Allard ........................ 144/248.4
5,960,104 A * 9/1999 Conners et al. ............... 382/141
6,026,689 A * 2/2000 Snyder et al. .................. 73/602
6,293,152 B1 9/2001 Stanish et al.
6,305,224 B1 * 10/2001 Stanish et al. .................. 73/597
6,308,571 B1 * 10/2001 Stanish et al. .................. 73/597
6,463,402 B1 10/2002 Bennett et al.
6,598,477 B2 * 7/2003 Floyd ............................. 73/597
6,612,216 B2 * 9/2003 McGehee et al. ............ 83/425.4
6,624,883 B1 * 9/2003 Zhou et al. ................. 356/237.1
6,756,789 B1 6/2004 Parker et al.
6,757,354 B2 * 6/2004 Skatter et al. ................... 378/58
6,773,552 B1 * 8/2004 Albert et al. .................. 162/263
6,817,393 B2 * 11/2004 Quenneville .................. 144/357
6,877,411 B2 * 4/2005 McGehee et al. ............ 83/425.4
6,996,497 B2 * 2/2006 Floyd et al. ................... 702/181
7,004,055 B2 * 2/2006 Buchanan et al. ........... 83/425.3
(Continued)

OTHER PUBLICATIONS

Non-Final Office Action, Notification Date: Apr. 29, 2011, pending U.S. Appl. No. 12/912,950, First Named Inventor: Mark A. Stanish.

*Primary Examiner* — David J. Walczak
*Assistant Examiner* — Jennifer C Chiang
(74) *Attorney, Agent, or Firm* — Weyerhaeuser Law Dept

(57) ABSTRACT

Methods for reducing warp potential of lumber derived from a raw material, such as a log or stem are provided. The methods involve examining the log or stem for shrinkage properties and/or properties of spiral grain. The location of the shrinkage properties and/or properties of spiral grain determine how the log is oriented relative to a cutting device. In another embodiment, these characteristics determine what cutting pattern is selected for creating the lumber. In the case of a stem, these characteristics determine how the stem will be bucked.

19 Claims, 21 Drawing Sheets

Average crook for 10-ft. logs harvested in Georgia (by height position in the tree).

(56) References Cited

U.S. PATENT DOCUMENTS

| | | | | |
|---|---|---|---|---|
| 7,017,413 | B2 * | 3/2006 | Floyd et al. | 73/597 |
| 7,043,990 | B2 * | 5/2006 | Wang et al. | 73/597 |
| 2003/0150277 | A1 * | 8/2003 | Andrews et al. | 73/801 |
| 2005/0011263 | A1 * | 1/2005 | Harris | 73/579 |
| 2005/0031158 | A1 * | 2/2005 | Biernacki et al. | 382/100 |

* cited by examiner

Average crook for 10-ft. logs harvested in Georgia (by height position in the tree).

Average bow for 10-ft. pine logs harvested in Georgia (by height position in the tree).

Log-average crook for 16-ft. butt logs harvested in Arkansas (vs. average log stress-wave velocity).

Log-average bow for 16-ft. butt logs harvested in Arkansas (vs. average log stress-wave velocity).

Typical patterns of sound velocity variation in crook-prone lumber.
(16-ft. 2x4's from the Wright City mill)

Typical patterns of sound velocity variation in straight lumber.
(16-ft. 2x4's from the Wright City mill)

Ultrasound velocity patterns in loblolly pine trees.
(10 trees harvested in Arkansas)

Log-average crook change (90%RH to 20%RH) vs. average log stress-wave velocity, for 16-ft. butt logs harvested in Arkansas.

Log-average bow change (90%RH to 20%RH) vs. average log stress-wave velocity, for 16-ft. butt logs harvested in Arkansas.

Sound velocity maps for 24-inch-long segments from log #349.

Sound velocity maps for 24-inch-long segments from log #171.

Sound velocity maps for log #171, after rotation and translation of the sawing diagram.

Comparison of the warp predicted after log rotation with the warp as actually sawn for log #171.

Sound velocity maps for 24-inch-long segments from log #552.

Sound velocity maps for log #552, after rotation and translation of the sawing diagram.

Comparison of the warp predicted after log rotation with the warp as actually sawn for log #552.

Log 171

Sound velocity map of log cross section

Grain-Angle Model for Twist Prediction

METHOD FOR REDUCING WARP POTENTIAL WITHIN LUMBER DERIVED FROM A RAW MATERIAL

FIELD OF THE INVENTION

This invention relates generally to a method for reducing warp potential of lumber derived from a raw material, such as a log or stem.

BACKGROUND OF THE INVENTION

Research and observation suggest that some trees or logs produce mostly straight lumber, while others result in a larger proportion of warped pieces. The range of lumber warp variability among logs has been found to be especially broad among butt logs, a class of logs which also generally includes those with the greatest log-average lumber crook and bow. To illustrate, FIG. 1 shows data from lumber cut from 30 pine trees harvested in Georgia, and compares log-average crook values for logs from three different height locations in each tree—butt, second, and third.

In general, butt logs are the most affected by lumber crook. In fact, about one-third of these trees (9 of 30) had butt logs with substantially greater log-average crook than any of the other logs. The other two-thirds of the butt logs had somewhat greater log-average crook than that of the second or third logs. The log-average bow values are compared by log position in the tree in FIG. 2. The same observations that were made for crook also apply to bow, although there are perhaps relatively fewer trees having butt logs with extreme log-average values, and the difference between those extreme values and the log-average bow of the other logs is somewhat less than in the case of crook.

These Figures suggest that for crook and bow, the most warp-prone logs are usually found among a minority of the butt logs. One means of partially distinguishing between warp-prone and warp-stable logs is by using the average stress-wave velocity of the log, as measured for example, using resonance methods. FIGS. 3 and 4 show how log-average crook and bow, respectively, relate to average log stress-wave velocity in loblolly pine butt logs harvested in Arkansas. Logs with stress-wave velocity at or near the high end of the range have relatively low log-average crook and bow. Those logs with lower stress-wave velocities, which constitute the majority of the logs, may also have low log-average crook and bow. However, a fraction of the lower-stress-wave velocity logs have high log-average warp. In other words, high-stress-wave velocity logs have low potential for lumber warp, but low-stress-wave velocity logs are not necessarily highly warp-prone. Consequently, for the majority of logs (those which are not near the high end of the range of stress-wave velocity), the average stress-wave velocity of the log is not in itself an effective means to discriminate between logs with high potential for lumber warp and those with low potential.

Accordingly, a need exists for a method to detect warp potential of lumber to be derived from a raw material, such as a log or stem, and to reduce that warp potential before the lumber is derived.

BRIEF DESCRIPTION OF THE DRAWINGS

The embodiments of the present invention are described in detail below with reference to the following drawings.

DETAILED DESCRIPTION OF THE INVENTION

The present invention generally relates to a method for reducing warp potential of lumber derived from a raw material, such as a log or stem. The method involves examining the log or stem for shrinkage properties and/or one or more properties of spiral grain. In the case of a log, the location of the shrinkage properties and/or properties of spiral grain determine how the log is positioned relative to, for example, a cutting device. The log is oriented to reduce warp potential of the lumber which will be cut from the log when the log contacts the cutting device, or vice versa. In another embodiment, a cutting pattern is selected based on the shrinkage properties and/or the spiral grain properties. In the case of a stem, the location of the shrinkage properties and/or properties of spiral grain angle determine how the stem will be bucked. Logs which are bucked may be allocated based on subsequent processing of the logs, such as, for example, saw logs (lumber); peeling logs (for veneer); chipping; stranding; pulping, or the like.

Figure 5:
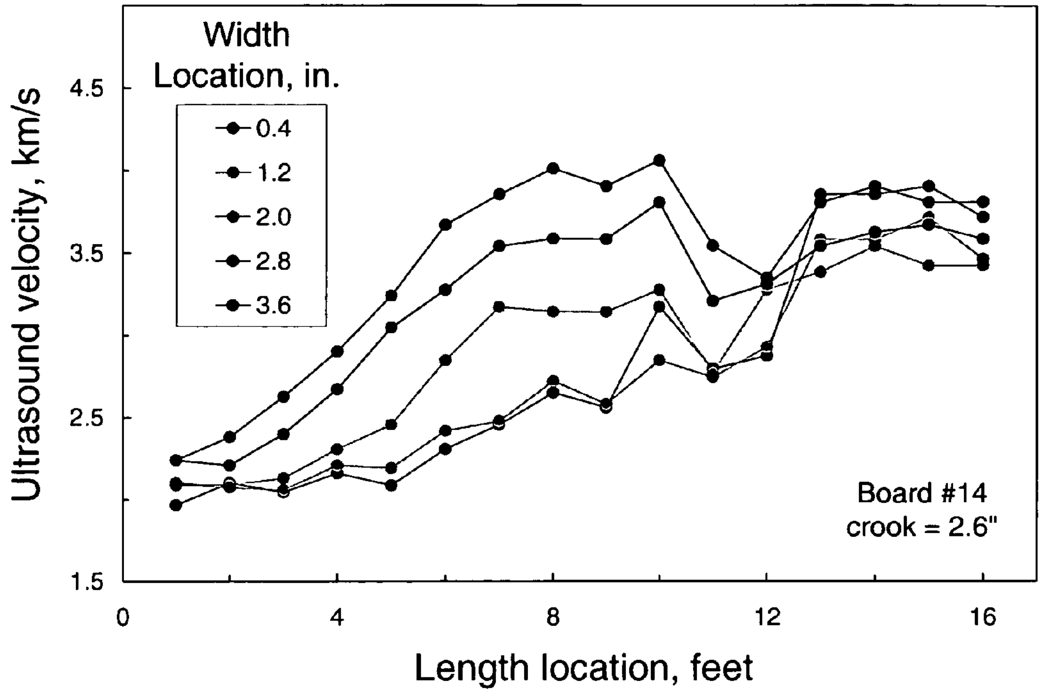
FIG. 5 illustrates plots of patterns of sound velocity variation in crook-prone lumber.
Figure 5:
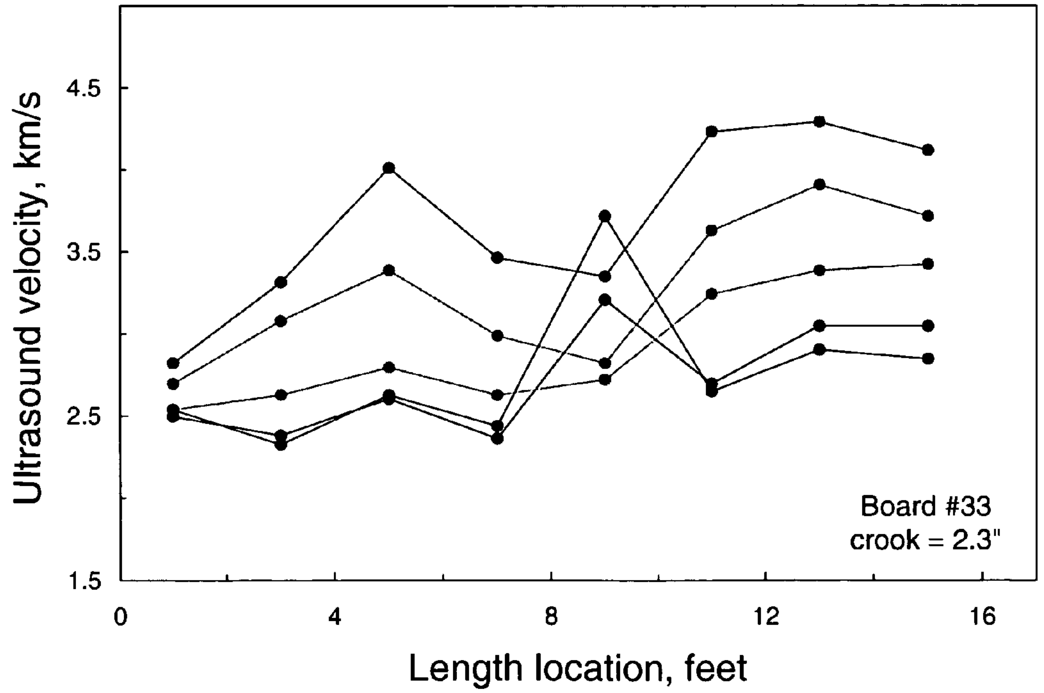
Figure 6:
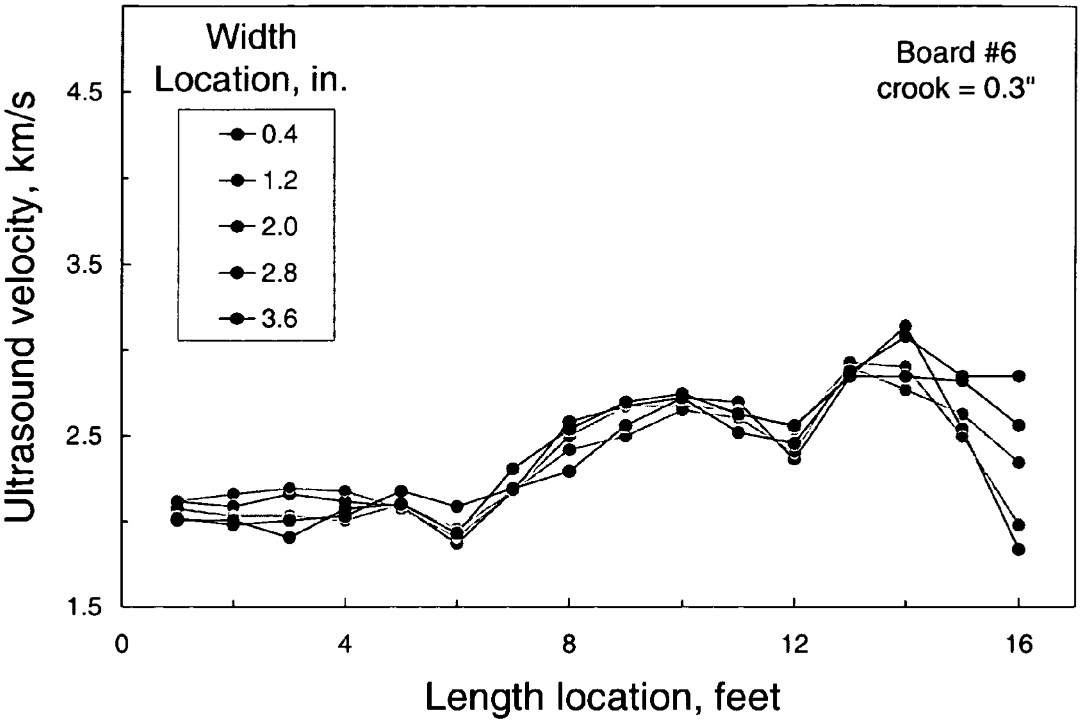
FIG. 6 illustrates plots of patterns of sound velocity variation in straight lumber.
Figure 6:
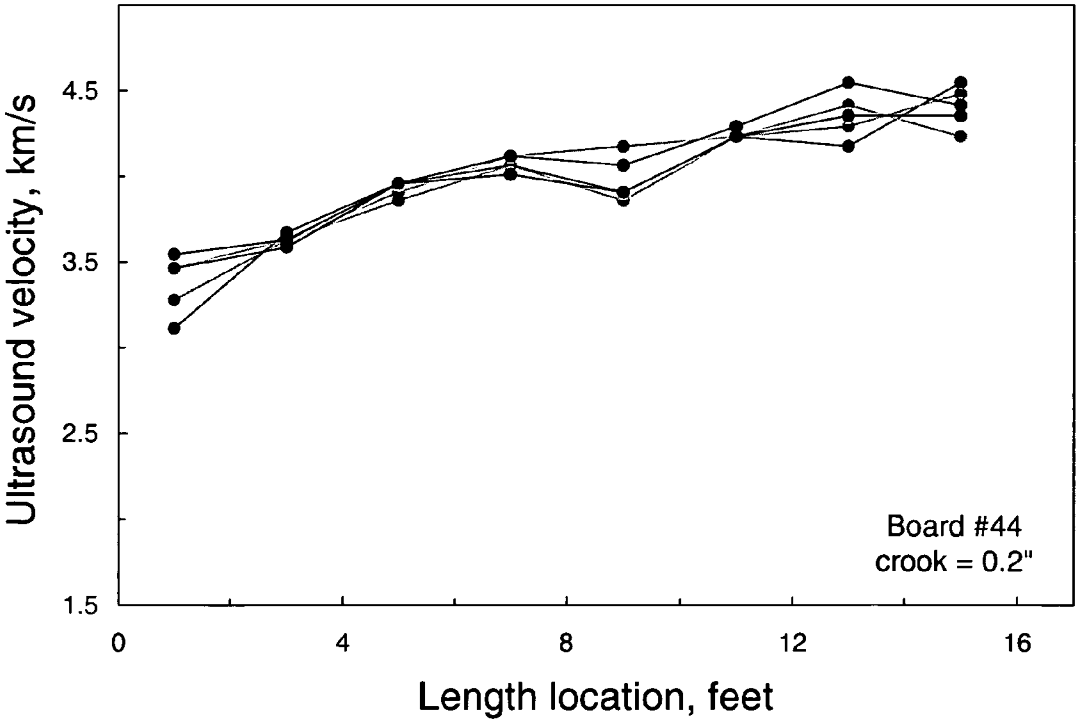

An approach to distinguishing high-warp logs from low-warp logs may be developed by considering the fundamental factors that govern lumber warp. Lumber crook and bow are caused by within-board variation of lengthwise shrinkage. Research has shown that the potential for a board to crook or bow can be predicted from its pattern of lengthwise shrinkage variation [U.S. Pat. No. 6,308,571]. Variation in lengthwise shrinkage is determined in large part by variation in the microfibril angle of the wood fiber. Variation in stiffness along the longitudinal direction also is determined in large part by variation in the microfibril angle of the wood fiber. Finally, both stiffness and sound velocity along the longitudinal direction are closely correlated in wood. Consequently, the pattern of shrinkage variation in a board is closely related to the patterns of variation in microfibril angle, stiffness, or sound velocity. Research has also shown that, while there exists a wide variety of shrinkage-, microfibril angle-, stiffness-, and sound velocity patterns in any population of lumber, warp-prone lumber exhibits patterns of variation that are distinctly different from those seen in more stable lumber. FIG. 5 displays examples of the patterns of sound velocity variation found in crook-prone 2 inch by 4 inch boards ("2×4"). Boards that have a high potential for crook typically have steep edge-to-edge gradients in sound velocity (and also in shrinkage, microfibril angle, and stiffness) along some or all of their length. On the contrary, boards that have low potential for crook have little or no such gradients, as seen in FIG. 6.

Figure 7:
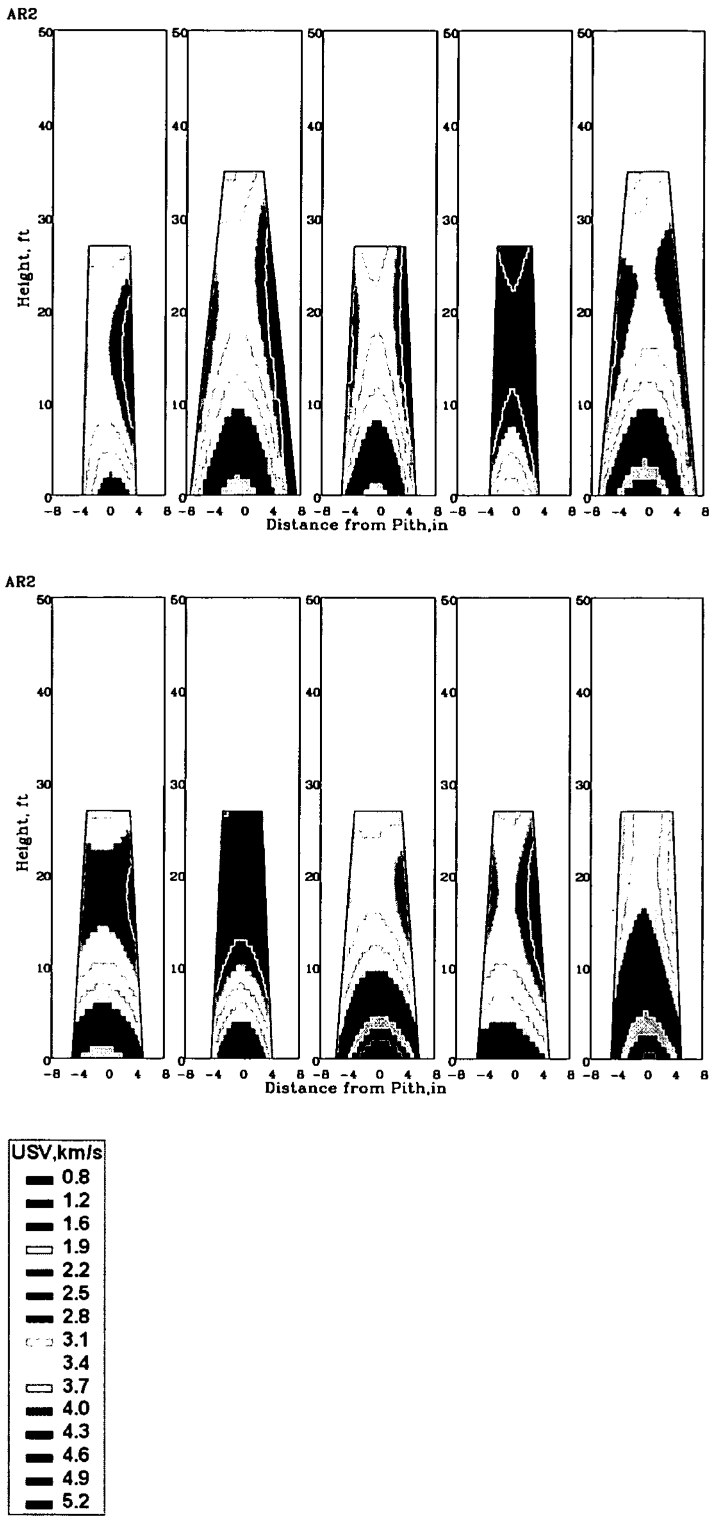
FIG. 7 illustrates plots of ultrasound velocity patterns in loblolly pine trees.

The sound velocity pattern that exists in any piece of lumber must derive from the sound velocity pattern that existed in its parent log. Research has shown that the pattern of sound velocity variation within a tree or log can be quite different between different trees. FIG. 7 shows several such examples. It would seem likely that the boards sawn from any one of the logs shown in FIG. 7 would have sound velocity patterns that are quite different from the boards sawn from most, if not all, of the other logs.

A key outstanding question with regard to distinguishing logs based on their potential for producing warp-prone lumber is whether particular patterns of shrinkage (as well as microfibril angle, stiffness, and sound velocity) in logs give rise to patterns in lumber that cause crook and bow. This may be suggested by the fact that the shrinkage variability within a tree tends to be greatest in the butt region, together with the observation that lumber from butt logs tends to be more prone to crook and bow, particularly in the region closest to the butt end.

Figure 1:
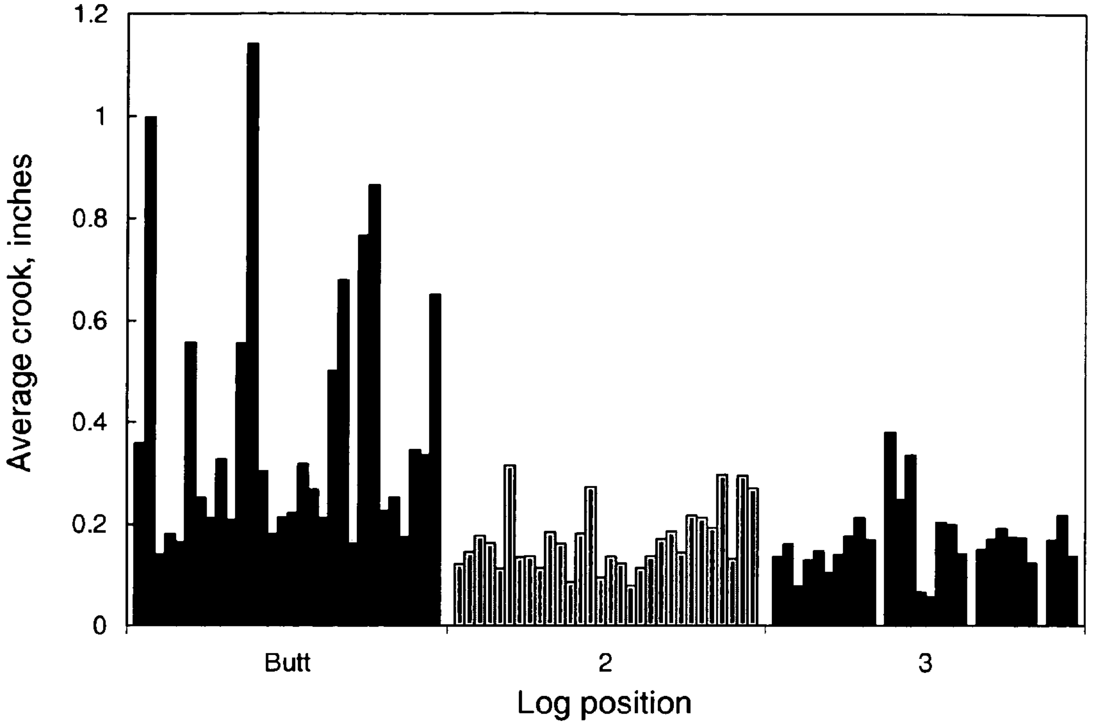
FIG. 1 is a plot of average crook for 10-ft. logs harvested in Georgia (by height position in the tree)
Figure 2:
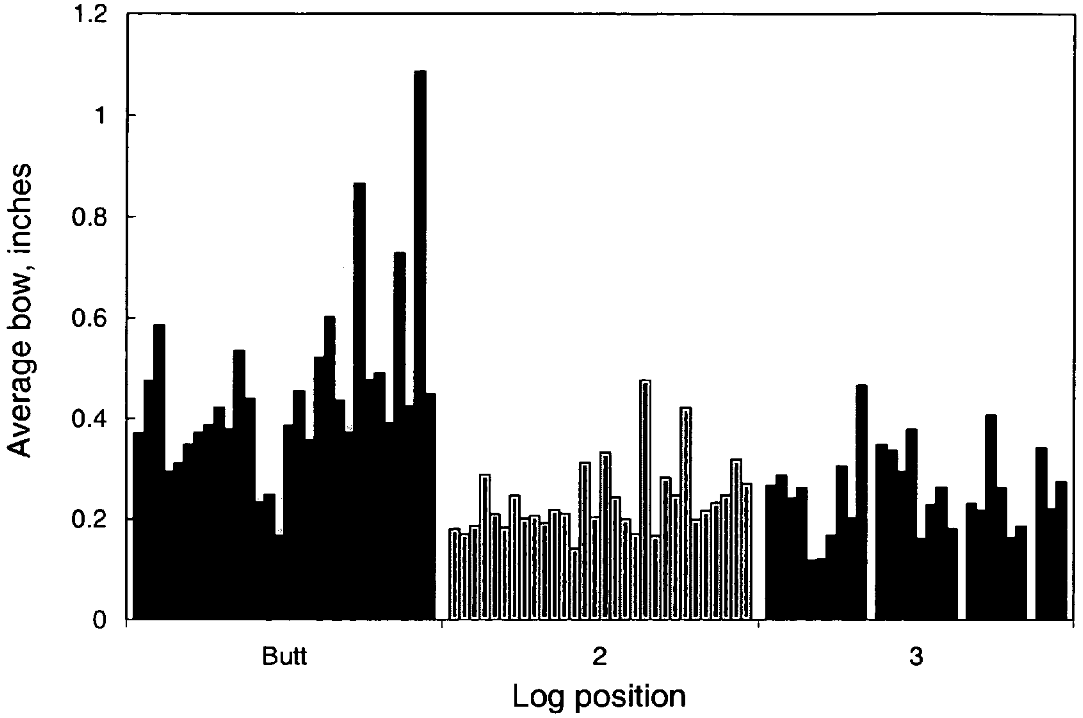
FIG. 2 is a plot of average bow for 10-ft. pine logs harvested in Georgia (by height position in the tree)
Figure 3:
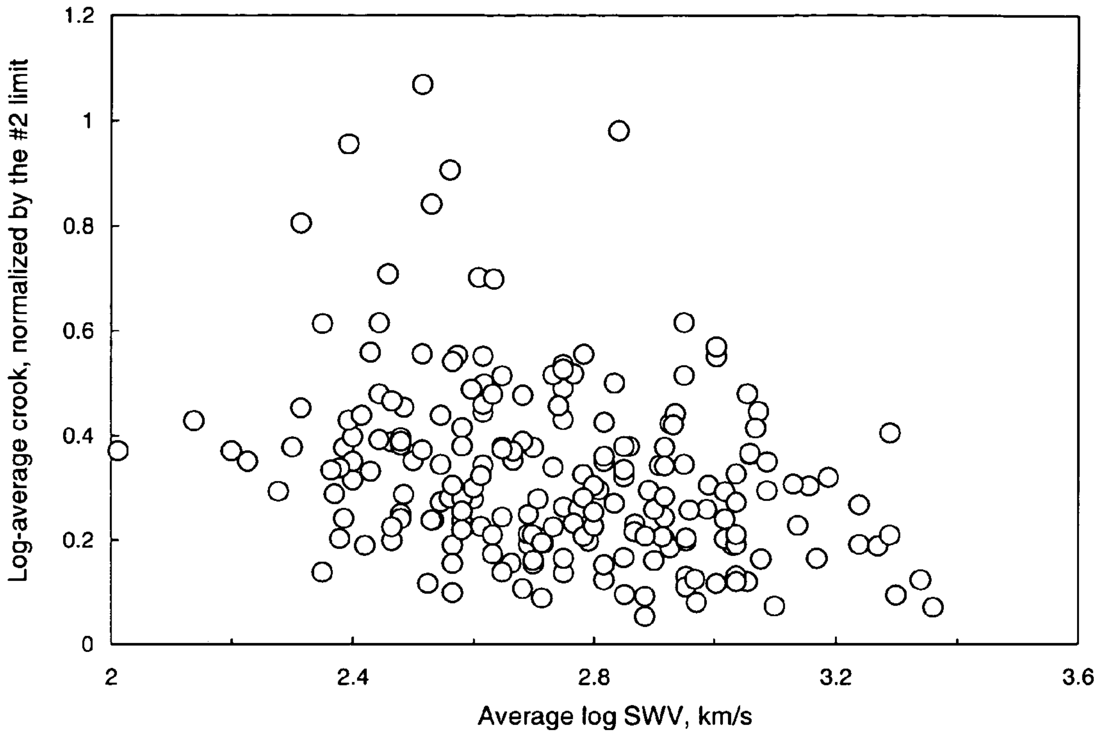
FIG. 3 is a plot of log-average crook for 16-ft. butt logs harvested in Arkansas (vs. average log stress-wave velocity)
Figure 4:
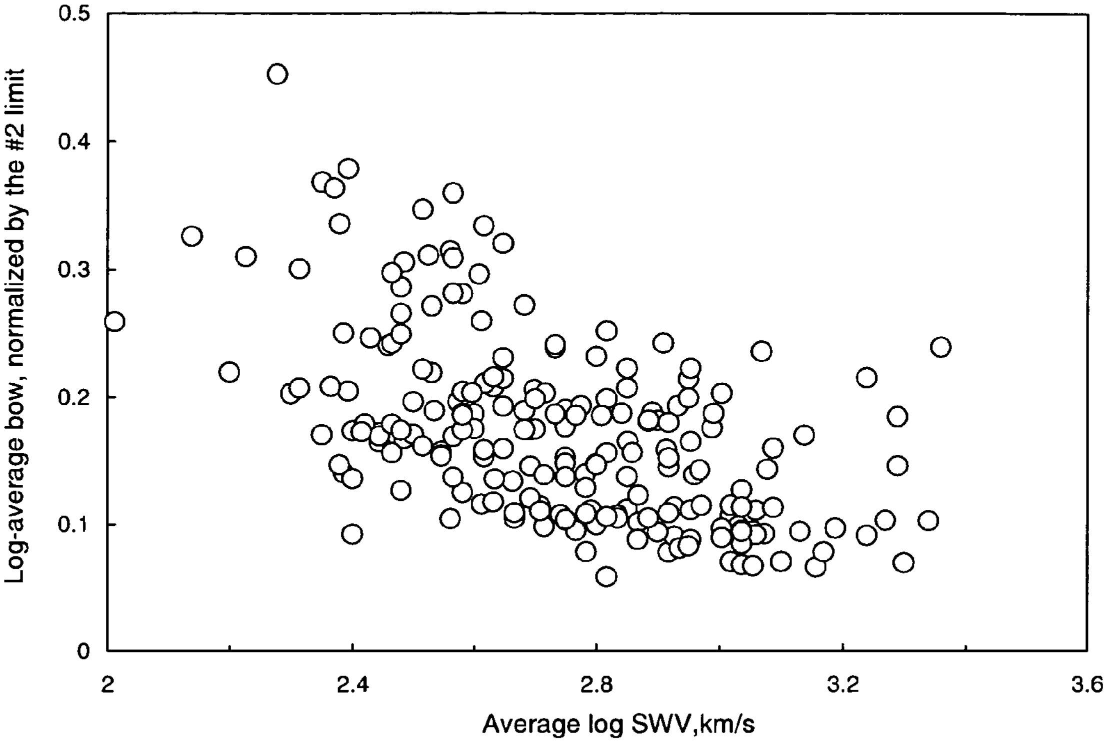
FIG. 4 is a plot of log-average bow for 16-ft. butt logs harvested in Arkansas (vs. average log stress-wave velocity)

Research aimed at answering that question employed the lumber sawn from a 41-log subset of the butt logs whose warp and stress-wave velocities are shown in FIGS. 3 and 4. This lumber was conditioned to moisture equilibrium at both 90% RH and 20% RH, and the crook and bow of each piece were measured at both equilibrium moisture contents. The log-average changes in crook and bow between 90% RH and 20% RH are shown as functions of average log stress-wave velocity in FIGS. 8 and 9, respectively, with selected logs highlighted.

Further testing was conducted to find out what distinguishes the high-lumber-warp logs from the low-lumber-warp logs, especially among logs with comparable average stress-wave velocity. These tests were directed specifically at determining whether particular patterns of sound velocity (and by inference, particular patterns of shrinkage, microfibril angle, or stiffness) in the logs are associated with high lumber warp. After conditioning and warp measurement, the boards from 19 of these 41 logs were each cut into 24-inch-long pieces. These pieces were grouped together by their parent log and reassembled into their original positions in the log, forming eight segments per log. Finally, the sound velocity in the log-length (longitudinal) direction was measured board-by-board and then mapped to the cross-section of each log segment.

Comparison of the sound velocity maps of each log with the measured warp data from the lumber sawn from that log revealed consistent relationships between the patterns of sound velocity variation within each log, the configuration of the boards relative to those patterns, and the crook and bow of the boards. A modeling analysis of these relationships showed that the sound velocity patterns can be used to quantify the warp potential of each log. By inference, the patterns of variation in shrinkage, microfibril angle, or stiffness in the log could also be used. Furthermore, this analysis showed that these patterns can also be used to determine which cutting patterns or log orientations would produce lumber with less potential to crook or bow.

Figure 21:
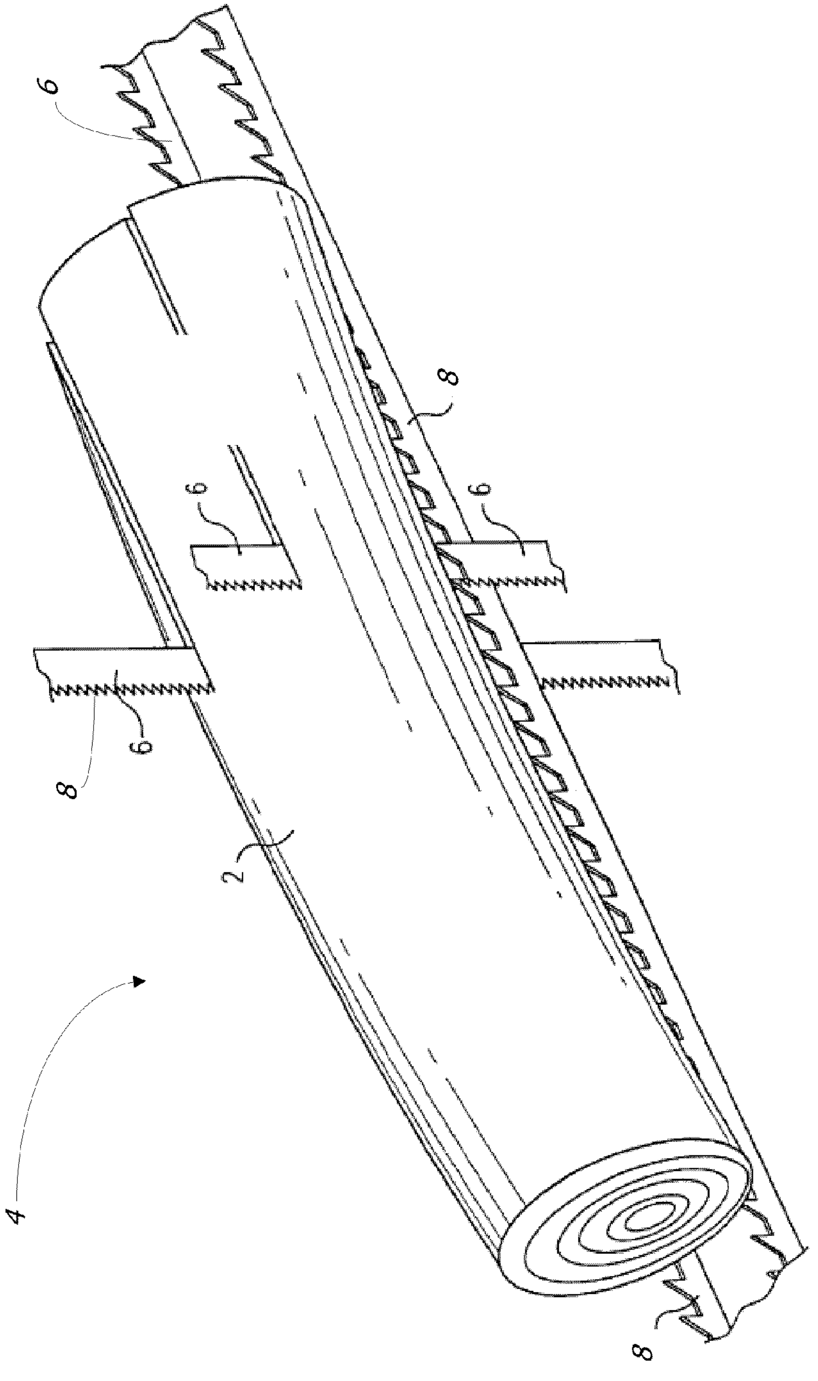
FIG. 21 is an illustration of a log in a primary breakdown system.

FIG. 21 is an illustration of a log 2 in a primary breakdown system 4. The present invention contemplates the use of cutting devices 6, such as saws, carriage band-saws, canter-twins, canter-quads, chip-and-saws, or the like. These cutting devices 6 may have blades, knives or other cutting surfaces 8. Based on the location of the shrinkage properties and/or properties of spiral grain in a log 2, the log 2 may be oriented with respect to the cutting surfaces 8 to provide lumber with reduced warp potential. In an alternate embodiment, a sawing or cutting pattern may be selected based on the location of the shrinkage properties and/or properties of spiral grain. This cutting pattern may then be used to trim the log 2.

Figure 8:
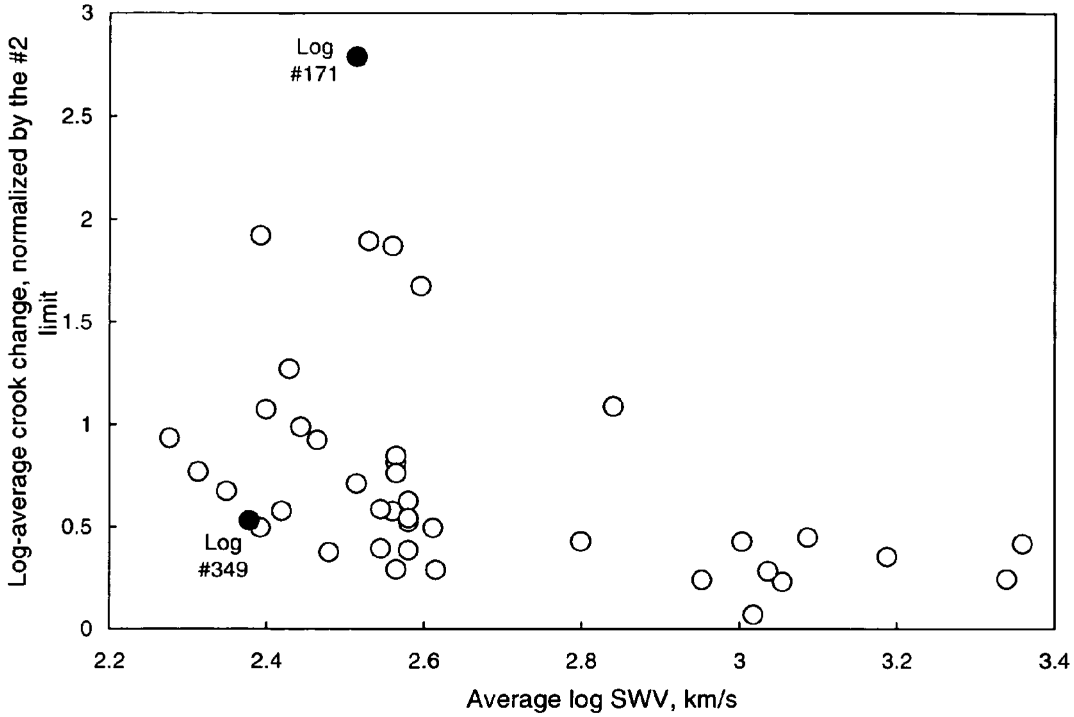
FIG. 8 is a plot of log-average crook change (90% RH to 20% RH) vs. average log stress-wave velocity, for 16-ft. butt logs harvested in Arkansas.
Figure 9:
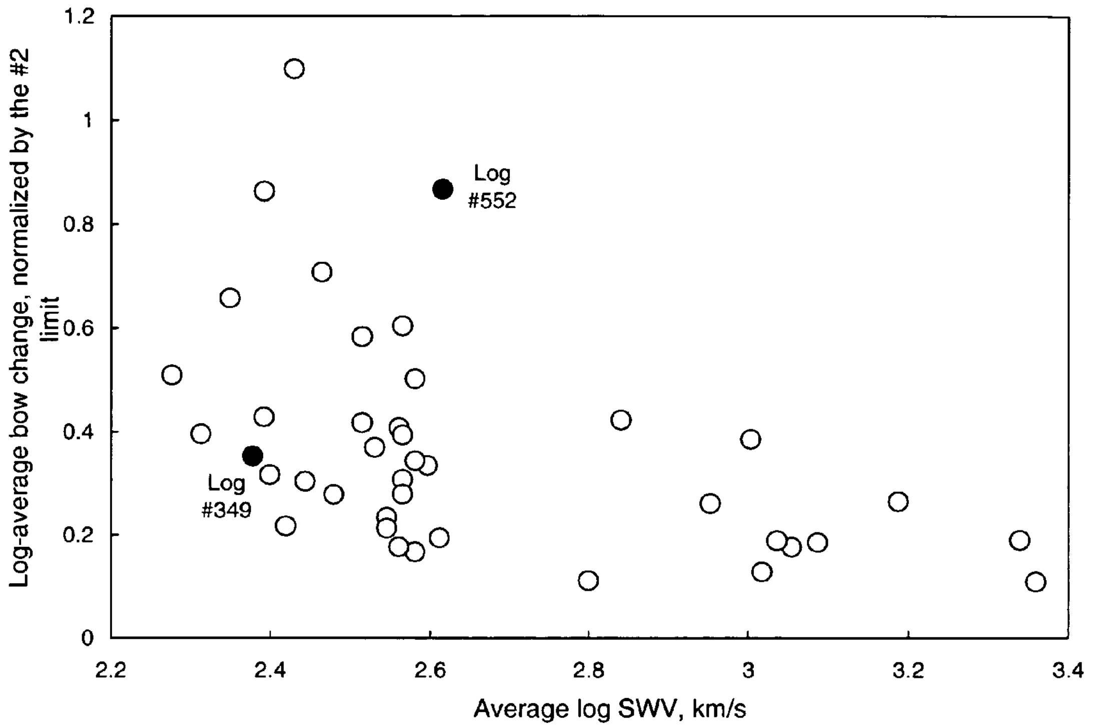
FIG. 9 is a plot of log-average bow change (90% RH to 20% RH) vs. average log stress-wave velocity, for 16-ft. butt logs harvested in Arkansas.
Figure 10:
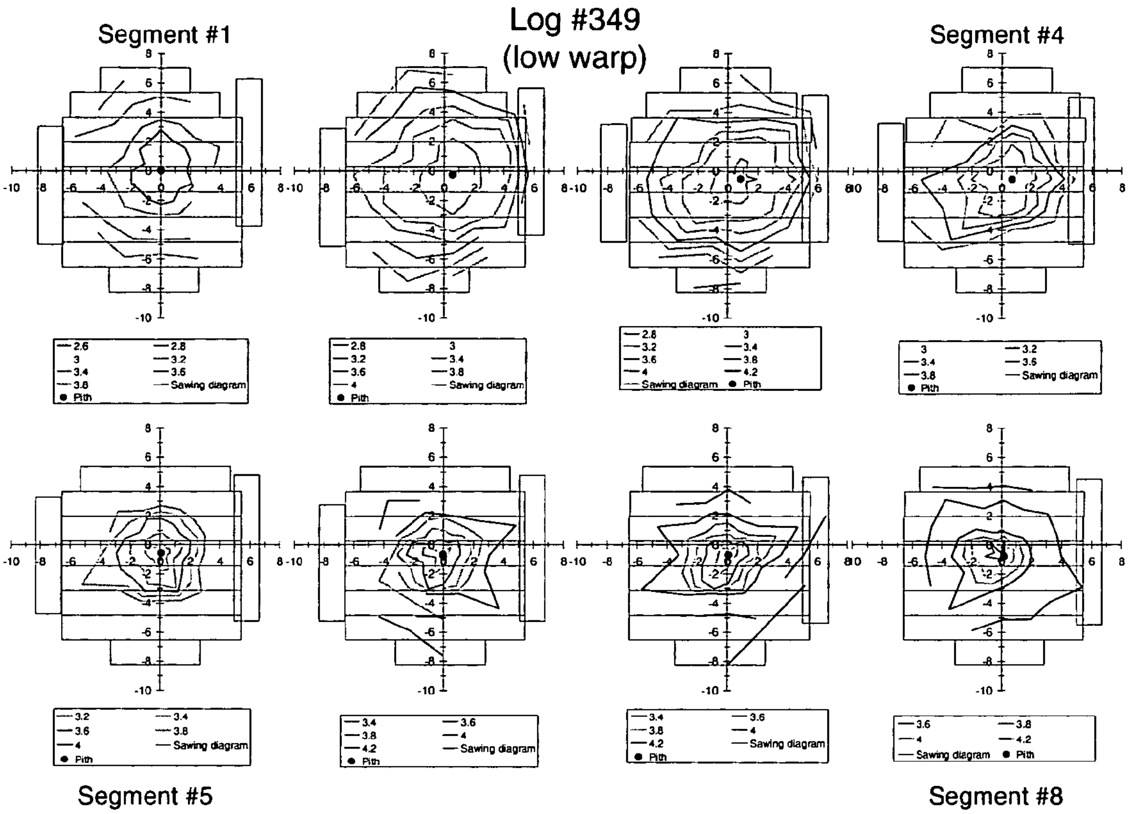
FIG. 10 is sound velocity maps for 24-inch-long segments from log #349.
Figure 11:
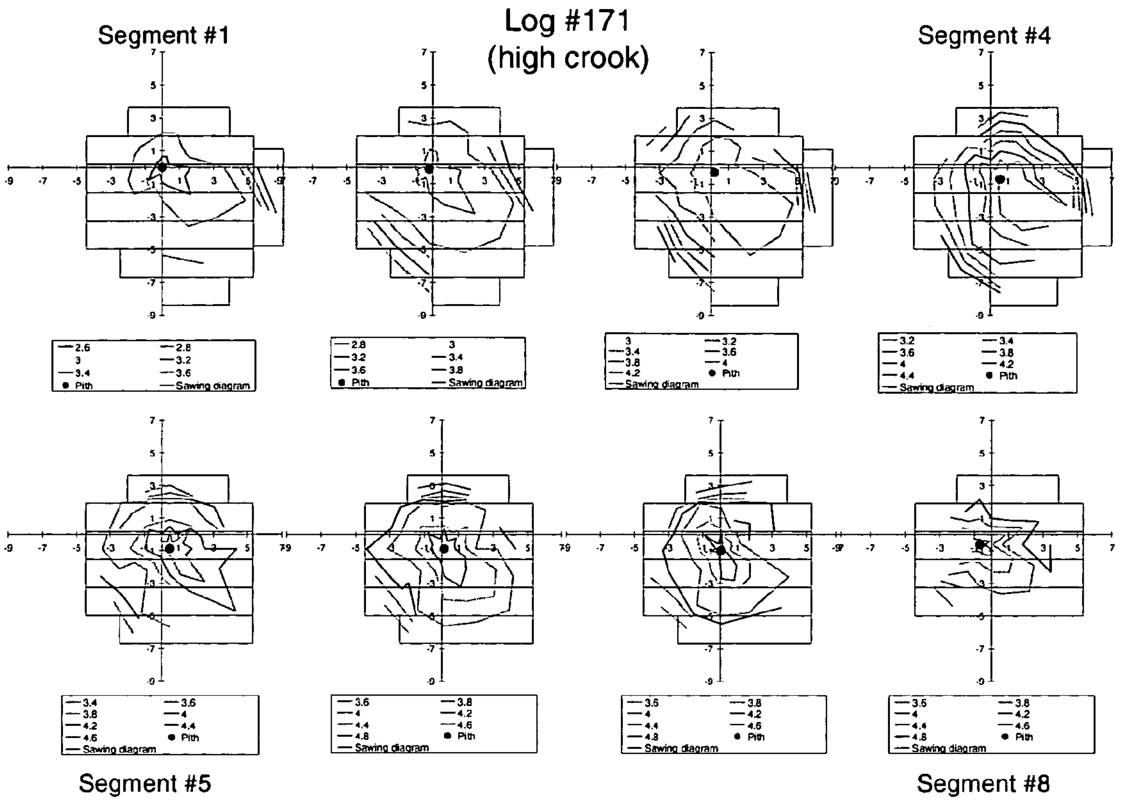
FIG. 11 is sound velocity maps for 24-inch-long segments from log #171.

FIG. 10 shows the sound velocity maps for each of the eight 24-inch-long segments from log #349. The actual board configuration, or sawing diagram, is shown as an overlay on each segment map. As shown in FIGS. 8 and 9, this log had quite low average stress-wave velocity, yet yielded lumber that was very stable with respect to crook and bow change. FIG. 11 shows the sound velocity maps and sawing diagram for the segments from log #171, which is a log with slightly higher average stress-wave velocity than log #349, but with substantially greater log-average crook change (FIG. 8). By comparison to FIG. 11, the sound velocity patterns in FIG. 10 are much more symmetrical (i.e., circular about the pith). Furthermore, the sawing diagram for log #349 is mostly centered over the sound velocity pattern such that the symmetry in the log's sound velocity pattern is projected onto the boards. The sound velocity (and shrinkage) pattern in each board is therefore quite symmetrical, especially from edge to edge, which would account for the relatively low levels of crook. This remains true despite the relatively high overall shrinkage levels associated with the low overall sound velocity values for this log. In contrast, the sound velocity patterns in log #171 are more asymmetric (elliptical rather than circular) and also more eccentric (i.e., not centered on the pith or on the center of the cross section). Furthermore, the sawing diagram for log #171 is positioned relative to the sound velocity pattern in such a way that the eccentricity of the log pattern results in very severe asymmetries in the boards, especially from edge to edge in most of the cant boards. This would account for the very high levels of crook measured in these boards.

Figure 12:
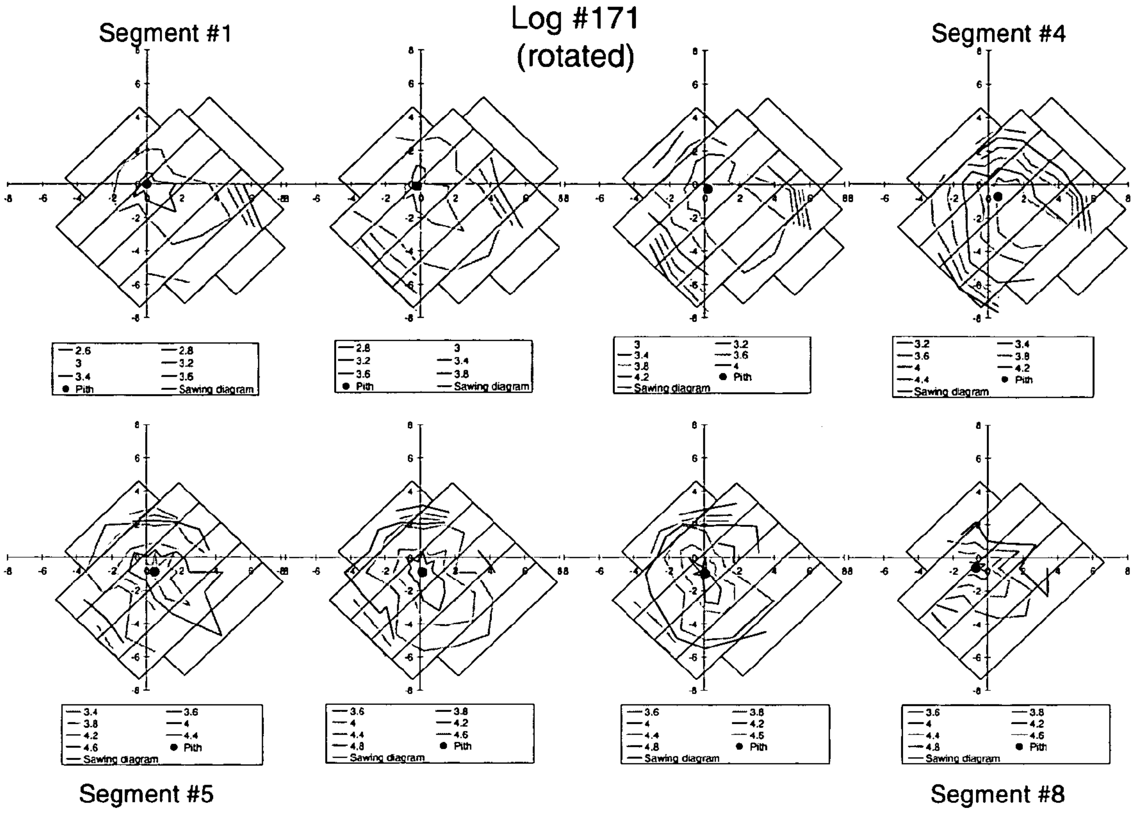
FIG. 12 is sound velocity maps for log #171, after rotation and translation of the sawing diagram.
Figure 13:
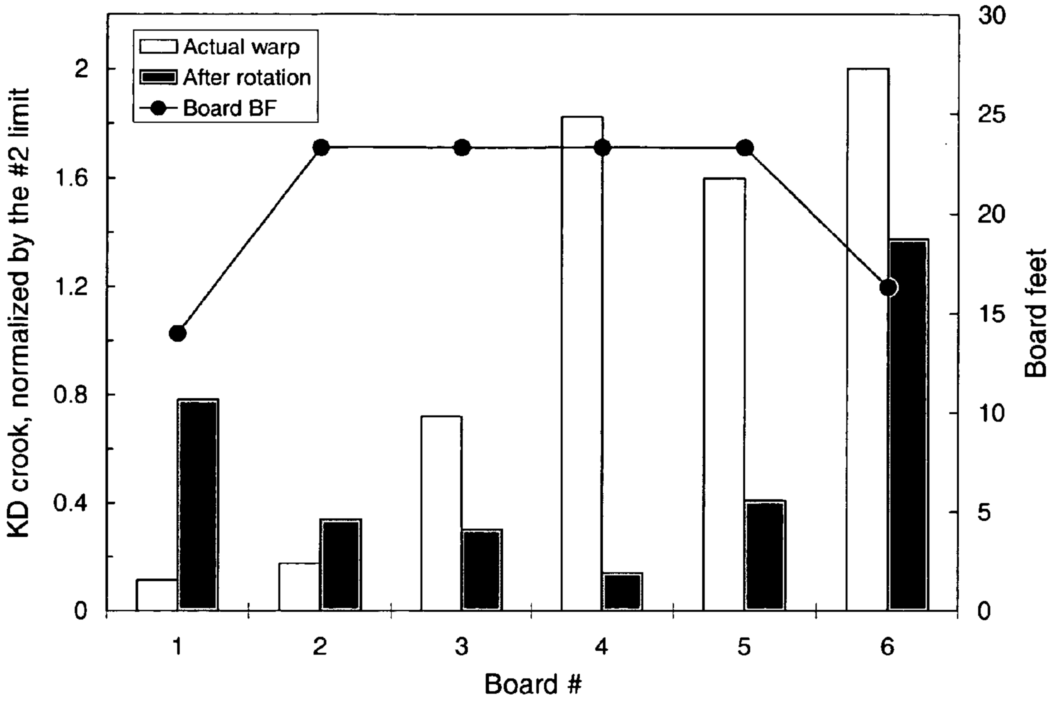
FIG. 13 is a comparison of the warp predicted after log rotation with the warp as actually sawn for log #171.

Support for the above interpretations was provided by a model-based analysis of the sound velocity and shrinkage patterns and the associated lumber warp in log #171. If the cause-effect interpretations are accurate, then the crook levels in the boards sawn from log #171 should be reduced by a rotation and shift of the sawing diagram relative to the sound velocity patterns, for example as shown in FIG. 12. While the sound velocity patterns and the board pattern and dimensions are the same, the simple change in orientation shown results in much more symmetric patterns of sound velocity and shrinkage in the boards, especially from edge to edge in the cant boards. Using the finite-element warp prediction model and sound velocity-shrinkage correlations developed in earlier research [U.S. Pat. No. 6,308,571], the crook of each theoretical board shown in FIG. 12 was determined. The results are compared with the measured crook of each corresponding actual board in FIG. 13, showing that the rotation in sawing pattern should substantially reduce the overall crook, and especially the crook of most of the wide-dimension cant boards.

Although the character and alignment of the sound velocity patterns in log #171 are largely consistent between all eight segments, in general this may not be the case. For example, in other logs, the degree of asymmetry or the direction of the elliptical axes of the sound velocity pattern can vary from segment to segment along the length of the log. It is worth noting that alignment between the sound velocity pattern and the sawing diagram is most critical near the middle of the log, and less so near the ends, because the curvature profile in the middle of each board has the greatest impact on the overall crook or bow of the board. Consequently, the alignment in the middle region of the log should normally weigh more heavily upon the choice of sawing orientation or cutting pattern.

Figure 14:
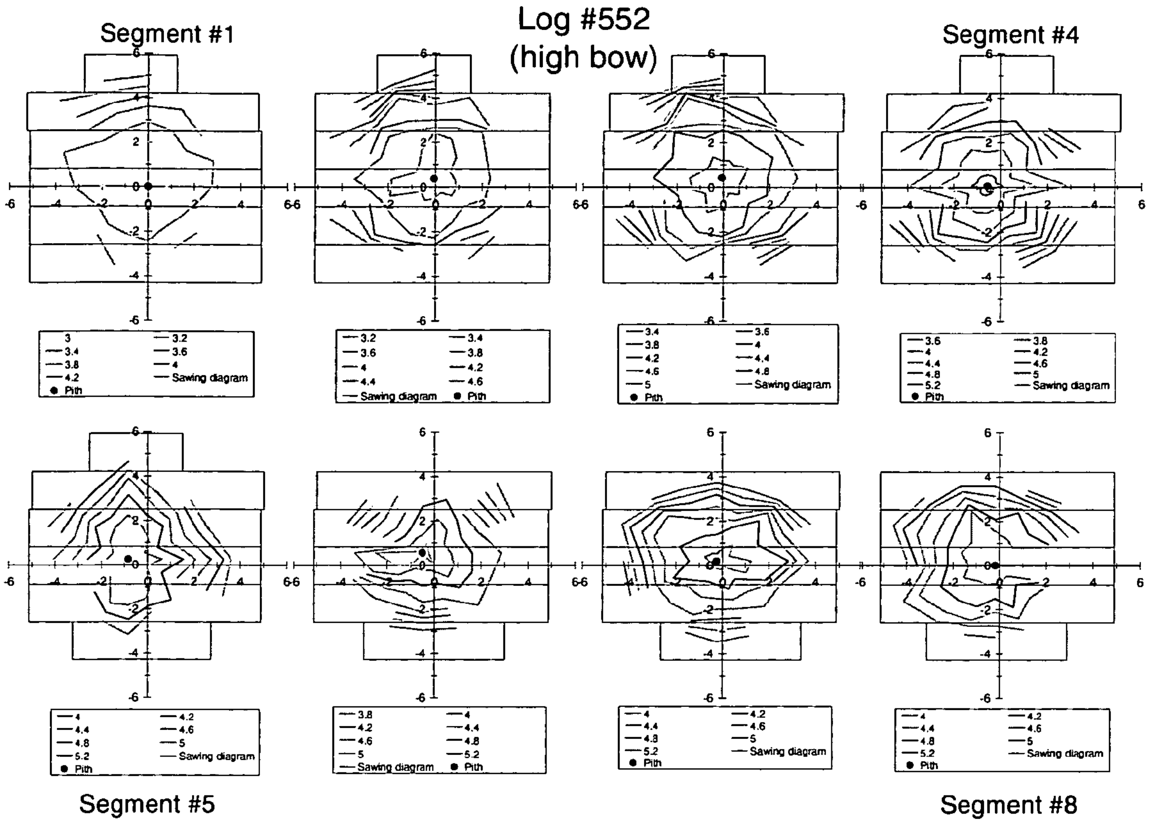
FIG. 14 is sound velocity maps for 24-inch-long segments from log #552.
Figure 15:
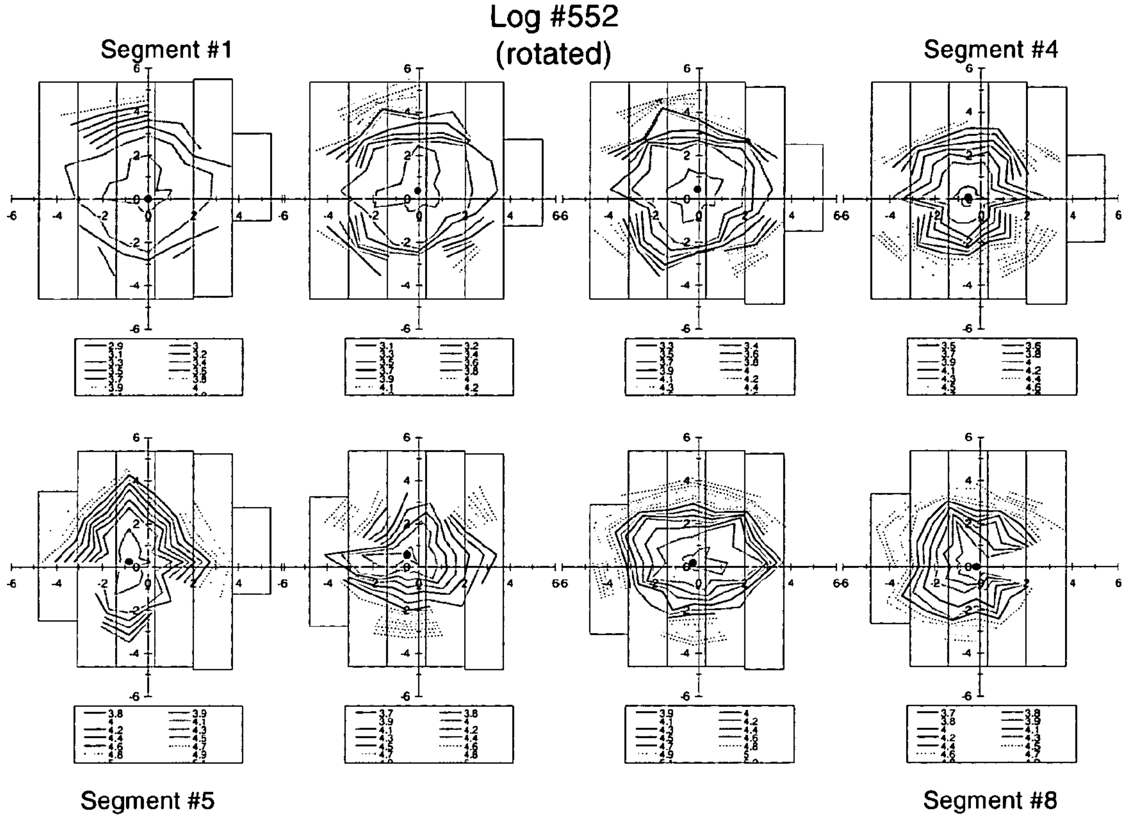
FIG. 15 is sound velocity maps for log #552, after rotation and translation of the sawing diagram.
Figure 16:
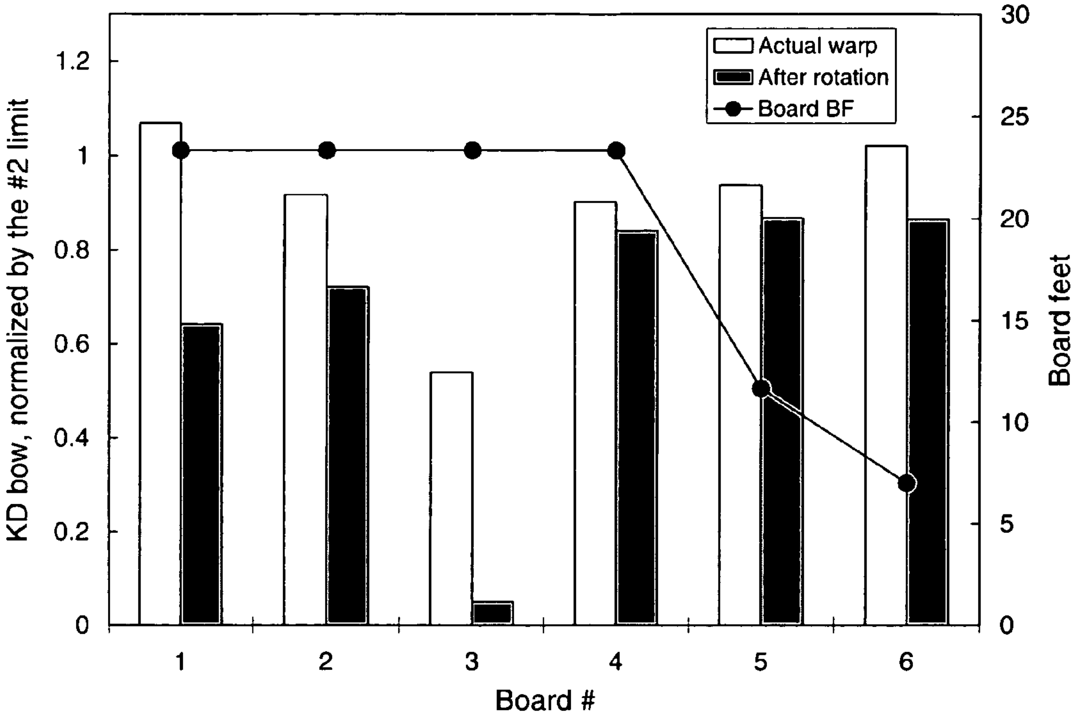
FIG. 16 is a comparison of the warp predicted after log rotation with the warp as actually sawn for log #552.

A further example is illustrated in FIG. 14, which shows the sound velocity maps for the segments from log #552, which is a log with slightly higher average stress-wave velocity than log #349, but with significantly greater log-average bow change (FIG. 9). Compared to those in log #349, the sound velocity patterns in log #552 are somewhat asymmetric, with the major elliptical axis oriented horizontally across the cant, and with steeper gradients in sound velocity (which indicates steeper gradients in shrinkage), especially in the upper and lower regions of the center cant. Those gradients are oriented from face to face in the center-cant boards, and therefore likely account for the relatively large values of bow in those boards. If this is true, then rotation of the sawing diagram by about 90 degrees, as shown in FIG. 15, would reduce the face-to-face gradients and should result in less bow. Finite-element modeling analysis of such a change in orientation confirmed that it would result in lower bow values, as shown in FIG. 16.

Figure 17:
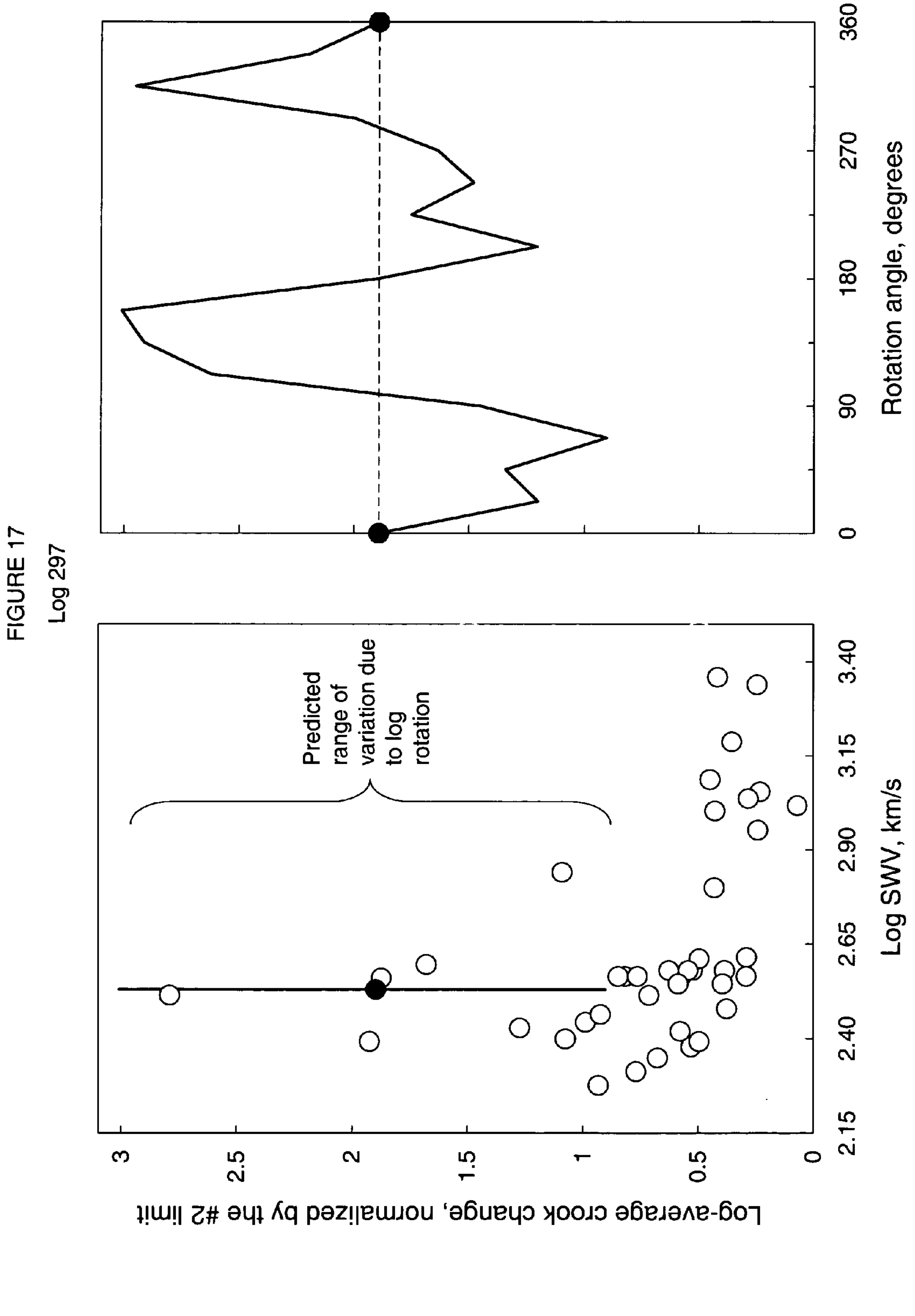
FIG. 17 is an illustration of the change in warp potential for log #297 based on rotation angle.
Figure 18:
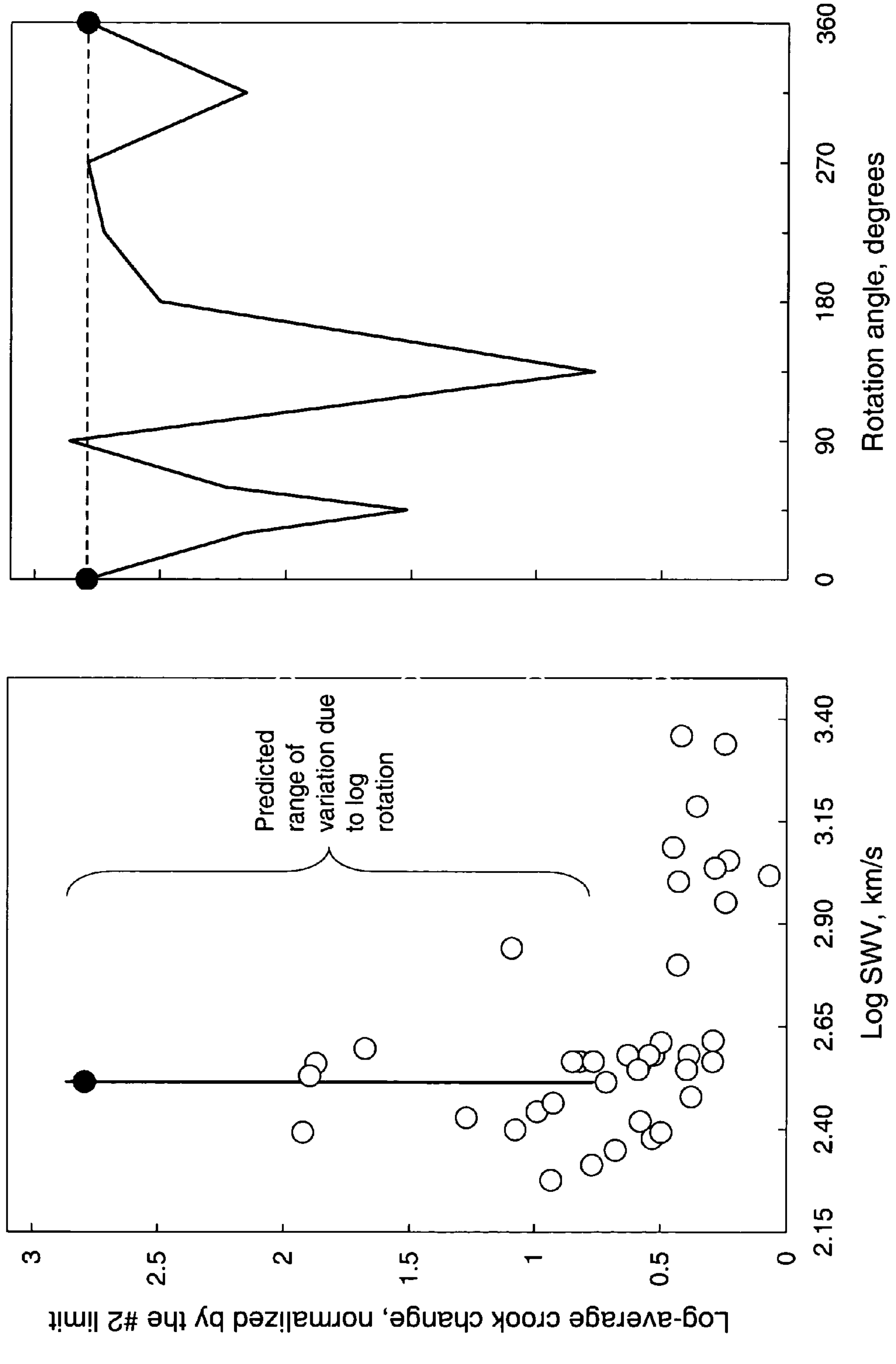
FIG. 18 is an illustration of the change in warp potential for log #171 based on rotation angle.

FIGS. 17 and 18 illustrate changes in lumber warp potential based on orientation of the log at primary breakdown as predicted by finite element modeling. From the figures it can be seen that a change in orientation can greatly affect the warp of the lumber derived. In other words, the warp potential of the lumber cut from a log is not solely an inherent property of that log, but instead depends also on the alignment between the cutting pattern and the log at breakdown. Specifically, in FIG. 17, warp potential can be reduced from a maximum crook to 25 percent of that value based on rotation angle of the log. In FIG. 18, warp potential can be reduced by over 70 percent. This phenomenon also provides some explanation for the wide spread of log-average warp values among logs having low stress wave velocity values, when the orientation of the logs at primary breakdown is set randomly. Further, the cyclic nature of the plots in FIGS. 17 and 18 supports the notion of matching the axis of symmetry of the log's internal shrinkage pattern with that of the cant in order to minimize the potential for lumber warp.

Several methods are contemplated for obtaining shrinkage properties. Single and multiple sensor groups, such as those which take various data and input the data into algorithms are contemplated. These data can include moisture content measurement, electrical property measurement, structural property measurement, acousto-ultrasonic property measurement, light scatter (tracheid-effect) measurement, grain angle measurement, shape measurement, color measurement, spectral measurement and defect maps. Also, any means of determining microfibril angle, for example using electromagnetic diffraction, is contemplated as a method for obtaining shrinkage properties. Non-destructive means and methods are also contemplated to determine the internal shrinkage profiles in intact logs, i.e., without having to section them into segments too short for sawing into commercially valuable lumber.

One broad class of options makes use of the established relationship between shrinkage and stiffness in wood, and is aimed at determining the internal stiffness patterns in the log as a surrogate for the internal shrinkage patterns. In one such approach, the bending stiffness of the log is determined in multiple axial planes. Differences in bending stiffness along different axial planes would reveal asymmetries and eccentricities in stiffness (and shrinkage) within the cross-section of the log similar to the asymmetries and eccentricities in sound velocity within the cross-sections of the logs shown in FIG. 11 (log #171) and FIG. 14 (log #552), for example. The bending stiffness of a log may be measured in different ways. One is by measuring flexural resonance of the entire log, for example, by suspending the log near each end and striking it near the middle, then measuring the vibration response. Another is by measuring the bending wave velocity, for example by striking the side of the log at one location and detecting the vibration at two locations on the same side, spaced down the length of the log.

Figure 19:
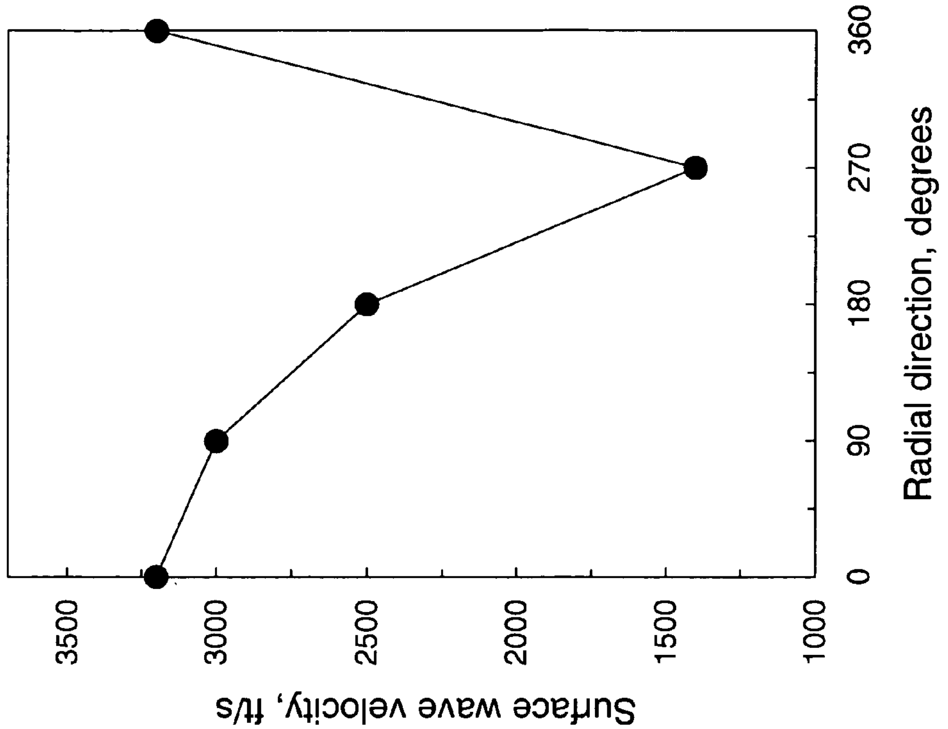
FIG. 19 is an illustration of a Spectral Analysis of Surface Waves (SASW) technique for measuring stress wave velocity in a sample and the corresponding plot based on location of stress wave velocity values within the log.
Figure 19:
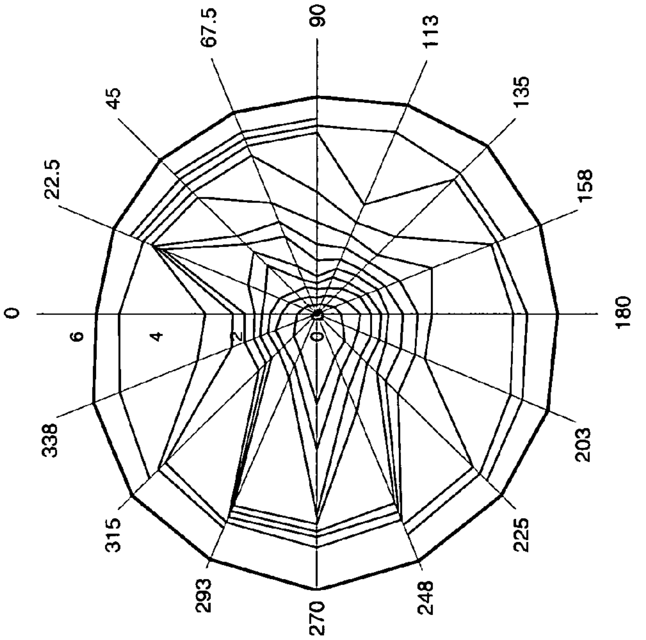

In another related approach, the surface wave velocity is measured and analyzed to determine the variation of shear modulus with depth below the surface. This method is employed widely in non-destructive testing of concrete structures and in seismic applications, and is referred to as Spectral Analysis of Surface Waves (SASW). An example is provided in FIG. 19. In this method, a shock impulse is applied on the surface and the vibration response of the surface is measured at two locations some distance away. The results are analyzed to determine the dispersion relationship, or the variation of surface wave velocity with frequency or wavelength. Since surface wave velocity is governed by the shear modulus of the underlying medium, the dispersion relationship can reveal the variation of shear modulus with depth beneath the surface. In wood, research has shown that the shear modulus and the longitudinal elastic modulus (stiffness) are related, so a measure of shear modulus variation with depth beneath the surface would indicate the variation of stiffness with depth, as well. By making such measurements at various locations over the surface of a log, the internal variation of shrinkage with depth could be mapped. The plot in FIG. 19 illustrates a drop in surface wave velocity (also characterized as an area of asymmetry) at approximately 270 degrees around the circumference of the log. This can provide an indication of high shrinkage near the surface. Thus, according to the present invention, the log may be oriented with respect to a cutting device, or an appropriate cutting pattern may be selected, to minimize warp potential of lumber derived from this log, taking into account the higher shrinkage in this region.

Another non-destructive method is to relate shrinkage patterns to other physical characteristics of the log. Such characteristics may be produced by, or related to, or may even have caused the particular shrinkage pattern within the log. For example, asymmetries and/or eccentricities in the internal shrinkage pattern may be revealed by external shape factors such as asymmetries or eccentricities in the profile of the log's surface.

Such relationships were suggested in U.S. Pat. No. 6,598,477 ("the '477 patent") and helped to form the rationale developed there for evaluating the warp potential of a log based in part on its deviation from cylindrical form. Combined with log average stress-wave velocity, such geometric measures yielded a log-average crook prediction R^2 of 0.49. Sound velocity maps from the 19 logs measured here suggest that internal shrinkage patterns are not always closely correlated to external geometry, which may be reflected in that earlier prediction result. Another factor influencing the prediction results in the '477 patent is that the impact on warp due to the interaction between log shrinkage patterns and board sawing patterns were not recognized or accounted for. That is, as shown in FIGS. 17 and 18 above, the warp properties of the lumber from a given log can be heavily influenced by the particular orientation of the sawing configuration applied to that log.

Figure 20:
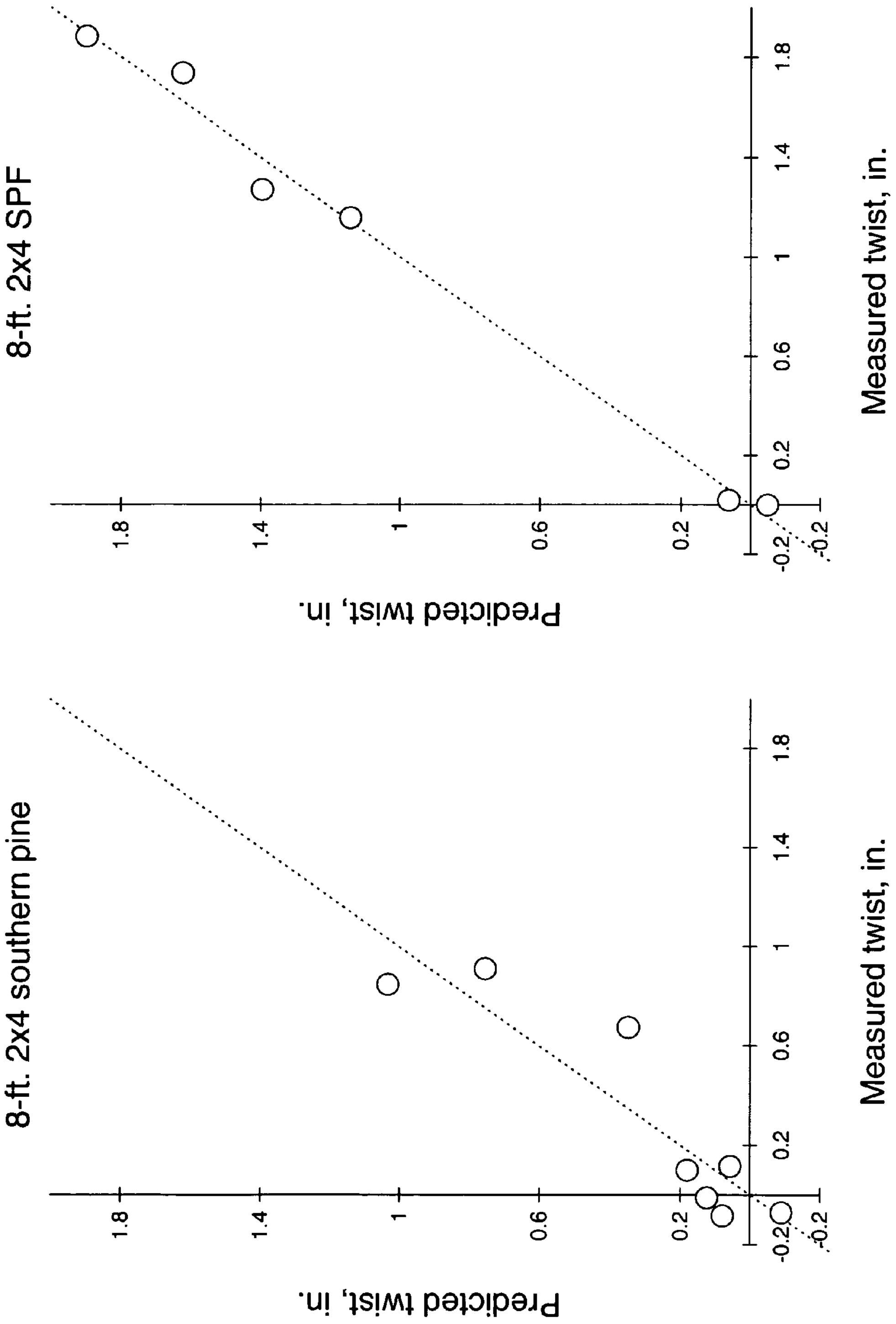
FIG. 20 is an illustration of twist prediction results using a grain angle model.

It is further contemplated to reduce warp in lumber derived from a log or stem where the type of warp detected is twist. As is generally known, twist is a form of warp caused by spiral grain within a raw material. Various methods have been described to determine twist potential. Lumber twist is caused by spiral grain, which generates a rotational distortion of the board when the fiber shrinks in the longitudinal and, especially, tangential directions. Research has shown that the potential for a board to twist can be predicted from the pattern of grain angle on its faces [U.S. Pat. No. 6,293,152], since the existence of spiral grain in a stem or log causes particular kinds of grain angle patterns to appear on the faces of the lumber produced from that stem or log. For example, one prediction model for twist uses the surface component of those grain angles. In that model, the predicted twist is proportional to the sum of the difference between the average surface angles on the two wide faces and the difference between the average surface angles on the two narrow faces. To illustrate, FIG. 20 shows twist prediction results for one set of boards compared to the actual twist that was measured in the same pieces. When a stem or log having a certain pattern of spiral grain is cut into lumber using a given cutting pattern, it results in certain patterns of grain angles on the faces of the boards produced, and in a certain amount of twist in that lumber. Once the properties of spiral grain are detected and measured, the log may be oriented to reduce twist potential in the derived lumber when the log is cut, or an appropriate sawing pattern may be selected for cutting the log. With respect to a stem, appropriate sites for bucking of the stem may be selected for breakdown.

As previously stated, it is contemplated that the present invention may be applied to a raw material, such as a stem. To this end, the stem may be examined to determine shrinkage properties and/or spiral grain properties using any of the methods described above. From this data, one or more locations may be determined at which to buck the stem to provide subsequent raw materials having a reduced warp potential. The stem may then be bucked at the one or more locations. Also taken into consideration may be the form of cutting used for the logs derived from the stem, such as, for example, sawing, chipping, peeling, or the like.

While the embodiments of the invention have been illustrated and described, as noted above, many changes can be made without departing from the spirit and scope of the invention. Accordingly, the scope of the invention is not limited by the disclosure of the embodiments. Instead, the invention should be determined entirely by reference to the claims that follow.

What is claimed is:

1. A method for reducing warp in lumber derived from a log, the method comprising the steps of:

examining the log to determine shrinkage properties of the log;

orienting the log with respect to a cutting device based on asymmetries or eccentricities in a pattern of the shrinkage properties, the orientation being effective to reduce warp of the lumber derived from the log when the cutting device contacts the log; and cutting the log using the cutting device to create the lumber.

2. The method of claim 1 wherein examining the log includes obtaining one or more measurements from the group consisting of: microfibril angle measurement, moisture content measurement, electrical property measurement, structural property measurement, acousto-ultrasonic property measurement, light scatter (tracheid-effect) measurement, grain angle measurement, shape measurement, color measurement, spectral measurement and defect maps.

3. The method of claim 1 wherein the cutting device has one or more cutting surfaces and further wherein the log is oriented with respect to those cutting surfaces.

4. The method of claim 1 further comprising the step of:

creating a sound velocity map after the step of examining the log to determine shrinkage properties of the log.

5. The method of claim 1 wherein the warp is crook or bow.

6. The method of claim 1 wherein orienting the log is also based on finite element modeling of the log.

7. The method of claim 1 wherein the warp is reduced by about 20% to about 70%.

8. The method of claim 1 wherein the cutting device is part of a primary breakdown system.

9. The method of claim 1 wherein examining the log to determine shrinkage properties of the log includes measuring stiffness properties.

10. The method of claim 1 wherein the cutting device is selected from the group consisting of saws, carriage bandsaws, canter-twins, canter-quads, and chip-and-saws.

11. A method for reducing warp in lumber derived from a log, the method comprising the steps of:

examining the log to determine shrinkage properties of the log;

orienting one or more cutting devices with respect to the log based on asymmetries or eccentricities in a pattern of the shrinkage properties, the orientation being effective to reduce warp of the lumber derived from the log when the cutting device contacts the log; and cutting the log using the cutting device to create the lumber.

12. The method of claim 11 wherein examining the log includes taking one or more measurements of: microfibril angle measurement, moisture content measurement, electrical property measurement, structural property measurement, acousto-ultrasonic property measurement, light scatter (tracheid-effect) measurement, grain angle measurement, shape measurement, color measurement, spectral measurement and defect maps.

13. The method of claim 11 wherein the warp is crook or bow.

14. The method of claim 12 wherein orienting the one or more cutting devices includes selecting a sawing diagram from a plurality of sawing diagrams.

15. The method of claim 11 wherein orienting the one or more cutting devices is also based on finite element modeling of the log.

16. The method of claim 12 wherein the warp is reduced by about 20% to about 70%.

17. The method of claim 12 wherein the one or more cutting devices are part of a primary breakdown system.

18. The method of claim 1 wherein the pattern of shrinkage properties is a sound velocity pattern and the step of orienting the log with respect to a cutting device based on asymmetries or eccentricities in the pattern of the shrinkage properties comprises centering a sawing diagram with respect to the sound velocity pattern.

19. The method of claim 11 wherein the pattern of shrinkage properties is a sound velocity pattern and the step of orienting one or more cutting devices with respect to the log based on asymmetries or eccentricities in a pattern of the shrinkage properties comprises centering a sawing diagram with respect to the sound velocity pattern.

* * * * *